US011509781B2

(12) United States Patent
Takahashi

(10) Patent No.: US 11,509,781 B2
(45) Date of Patent: Nov. 22, 2022

(54) INFORMATION PROCESSING APPARATUS, AND CONTROL METHOD FOR INFORMATION PROCESSING APPARATUS

(71) Applicant: CANON KABUSHIKI KAISHA, Tokyo (JP)

(72) Inventor: Toru Takahashi, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/529,591

(22) Filed: Aug. 1, 2019

(65) Prior Publication Data

US 2020/0053234 A1 Feb. 13, 2020

(30) Foreign Application Priority Data

Aug. 8, 2018 (JP) .............................. JP2018-149173

(51) Int. Cl.
*H04N 1/00* (2006.01)
*G06N 20/00* (2019.01)
*G06N 3/08* (2006.01)

(52) U.S. Cl.
CPC ......... *H04N 1/00323* (2013.01); *G06N 20/00* (2019.01); *H04N 1/00896* (2013.01); *H04N 1/00904* (2013.01); *H04N 2201/0094* (2013.01)

(58) Field of Classification Search
None
See application file for complete search history.

(56) References Cited

U.S. PATENT DOCUMENTS

| 5,822,077 | A | * | 10/1998 | Sasaki | ............... H04N 1/00885 |
| | | | | | 358/296 |
| 9,959,506 | B1 | * | 5/2018 | Karppanen | ......... G06F 16/9574 |
| 10,083,006 | B1 | * | 9/2018 | Feuz | ....................... H04W 4/12 |
| 10,305,766 | B1 | * | 5/2019 | Zhang | ................... G06N 3/0481 |
| 10,318,890 | B1 | * | 6/2019 | Kravets | ................ G06N 3/0454 |
| 10,558,862 | B2 | * | 2/2020 | Sanjay | ............... G06K 9/00771 |
| 10,605,470 | B1 | * | 3/2020 | Saxena | ................... H04L 67/12 |

(Continued)

FOREIGN PATENT DOCUMENTS

| JP | 06-189048 A | 7/1994 |
| JP | 2010-147725 A | 7/2010 |

(Continued)

OTHER PUBLICATIONS

Thomas Price, Eytan Lerba, "Machine Learning to Automatically Lock Device Screen at Opportune Time", Dec. 15, 2017, ip.com, IP.com No. IPCOM000252082D, pp. 1-35 (Year: 2017).*

*Primary Examiner* — Beniyam Menberu
(74) *Attorney, Agent, or Firm* — Canon U.S.A., Inc., IP Division

(57) ABSTRACT

A machine learning system includes a sensor configured to sense an object which is present in front of an information processing apparatus, a machine learning model configured to input time-series sensed values output from the sensor and to estimate whether a user who uses the image processing apparatus is present, a user interface configured to receive an operation performed by a user, and a learning unit configured to cause the machine learning model to learn with use of training data including the time-series sensed values output from the sensor and labels that are based on presence and absence of an operation performed by a user and received by the user interface.

13 Claims, 13 Drawing Sheets

(56) References Cited

U.S. PATENT DOCUMENTS

| | | | |
|---|---|---|---|
| 2011/0029465 A1* | 2/2011 | Ito | G06K 9/00778 |
| | | | 706/12 |
| 2011/0112997 A1* | 5/2011 | Sabe | G06N 20/00 |
| | | | 706/12 |
| 2011/0319094 A1* | 12/2011 | Usui | G01S 5/0294 |
| | | | 455/456.1 |
| 2013/0232515 A1* | 9/2013 | Rivera | G06Q 30/02 |
| | | | 725/12 |
| 2014/0029037 A1* | 1/2014 | Oyoshi | G06K 9/00362 |
| | | | 358/1.13 |
| 2015/0261168 A1* | 9/2015 | Yokoyama | G06F 1/3265 |
| | | | 399/81 |
| 2018/0082206 A1* | 3/2018 | Yang | G06F 16/29 |
| 2018/0122379 A1* | 5/2018 | Sohn | H04L 12/28 |
| 2018/0267592 A1* | 9/2018 | Nagasawa | H04N 1/00891 |
| 2019/0050688 A1* | 2/2019 | Iyer | A61B 5/7267 |
| 2020/0104999 A1* | 4/2020 | Edell | G06F 3/013 |

FOREIGN PATENT DOCUMENTS

| | | |
|---|---|---|
| JP | 2012-008771 A | 1/2012 |
| JP | 2017-135748 A | 8/2017 |
| JP | 2018-19361 A | 2/2018 |

\* cited by examiner

701

| INDEX | HUMAN PRESENCE SENSOR DATA | LABEL |
|---|---|---|
| 0 | tn_0 | ABSENCE OF USER (0) |
| 1 | tn_1 | ABSENCE OF USER (0) |
| 2 | tn_2 | ABSENCE OF USER (0) |
| 3 | tn_3 | ABSENCE OF USER (0) |
| ... | ... | ... |
| N-c-1 | tn_N-c-1 | ABSENCE OF USER (0) |
| N-c | tn_N-c | PRESENCE OF USER (1) |
| ... | ... | ... |
| N | tn_N | PRESENCE OF USER (1) |

702

| INDEX | HUMAN PRESENCE SENSOR DATA | LABEL |
|---|---|---|
| 0 | tk_0 | ABSENCE OF USER (0) |
| 1 | tk_1 | ABSENCE OF USER (0) |
| 2 | tk_2 | ABSENCE OF USER (0) |
| 3 | tk_3 | ABSENCE OF USER (0) |
| ... | ... | ... |
| K | tk_K | ABSENCE OF USER (0) |

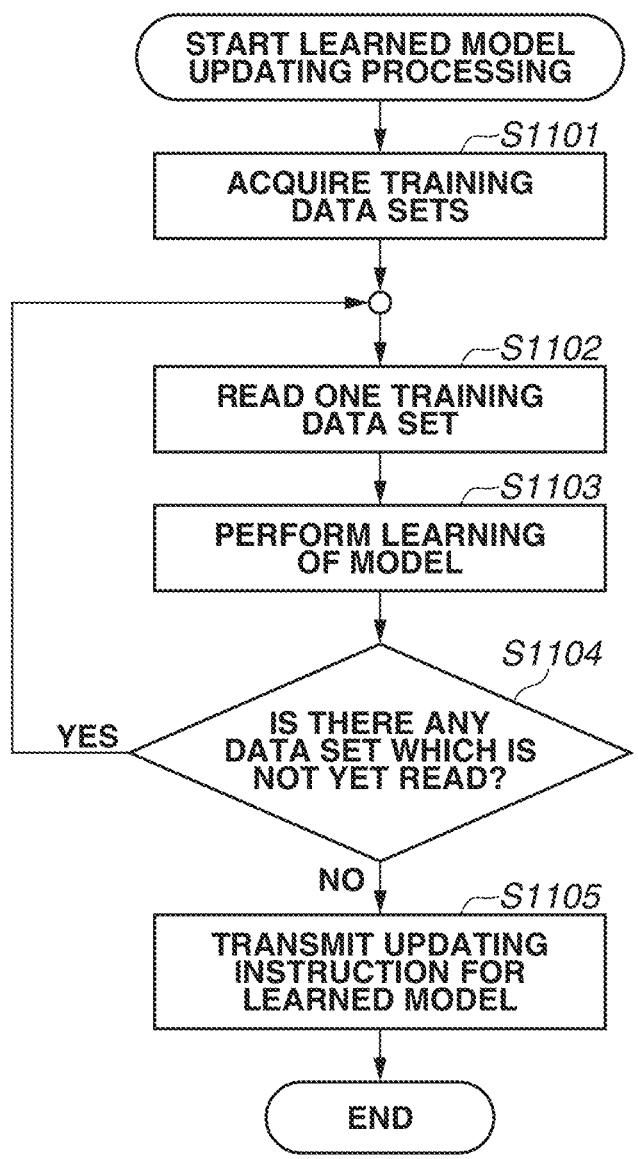

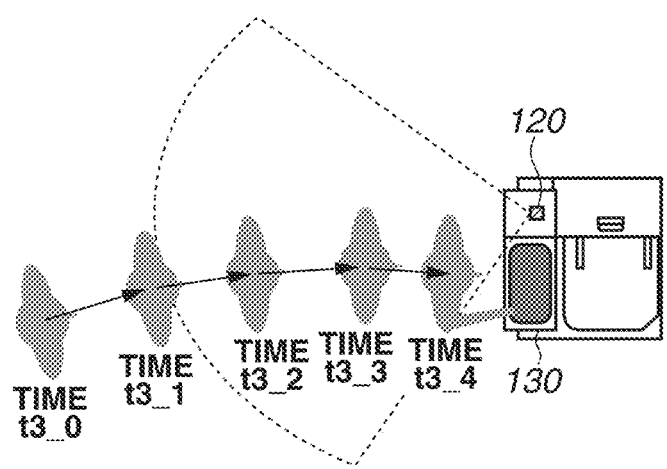

| TIME | USER PRESENCE OR ABSENCE ESTIMATION RESULT | USER OPERATION DETECTION RESULT |
|---|---|---|
| t4_0 | N | N |
| t4_1 | N | N |
| t4_2 | N | N |
| t4_3 | N | Y |

| INDEX | HUMAN PRESENCE SENSOR DATA | LABEL |
|---|---|---|
| 0 | t4_0 | ABSENCE OF USER (0) |
| 1 | t4_1 | ABSENCE OF USER (0) |
| 2 | t4_2 | PRESENCE OF USER (1) |
| 3 | t4_3 | PRESENCE OF USER (1) |

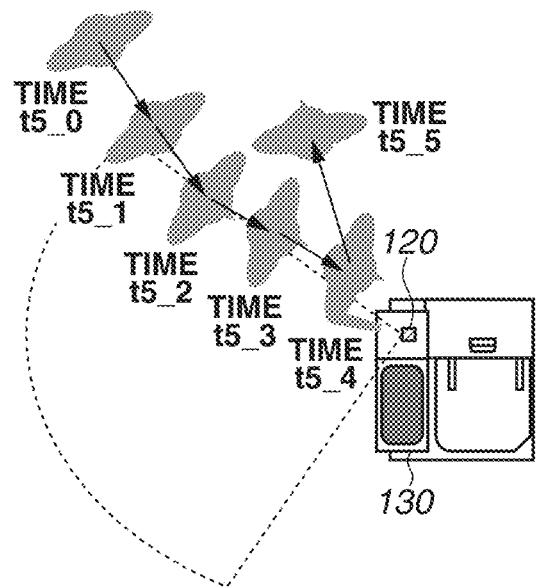

INFORMATION PROCESSING APPARATUS, AND CONTROL METHOD FOR INFORMATION PROCESSING APPARATUS

BACKGROUND

Field

Aspects of the disclosure generally relate to an information processing apparatus which estimates the presence of a user who uses the apparatus with use of, for example, a human presence sensor (a motion detector) to control the state of the apparatus, and a control method for the information processing apparatus.

Description of the Related Art

Heretofore, there have been image processing apparatuses each of which is equipped with a human presence sensor, estimates the presence of a user who uses the apparatus with use of measured data obtained from the human presence sensor, and returns from power saving mode based on a result of the estimation.

The apparatus discussed in Japanese Patent Application Laid-Open No. 2010-147725 is equipped with a human presence sensor of the electrostatic capacitance type and estimates the presence of a user based on an intensity detected by the sensor and a predetermined threshold value.

The apparatus discussed in Japanese Patent Application Laid-Open No. 2017-135748 is equipped with an infrared array sensor serving as a human presence sensor and estimates the presence of a user based on a predetermined feature of a two-dimensional image representing a heat source present in a range of detection performed by the sensor.

The apparatus discussed in Japanese Patent Application Laid-Open No. 2018-19361 is equipped with an ultrasonic sensor serving as a human presence sensor and estimates the presence of a user based on distance values of an object which reflects ultrasonic waves and a predetermined feature of a time series variation of the distance values.

However, in any of the above-mentioned estimation methods, the result of estimation may become incorrect depending on the installation environment of each apparatus, and, for example, the presence or absence of a noise generation source and its location or a difference in walking route of a user who approaches the apparatus affects the result of estimation. There is an issue that, if the result of estimation is incorrect, the image processing apparatus may return from power saving mode although the image processing apparatus is not intended to be used, thus wastefully consuming electricity.

The apparatus discussed in Japanese Patent Application Laid-Open No. 2010-147725 learns an actual apparatus operating environment with use of an intensity detected by the sensor and a history of the user operation and adjusts a threshold value which is to be used for estimation.

The apparatus discussed in Japanese Patent Application Laid-Open No. 2017-135748 previously defines image patterns which can be measured with respect to respective changeable orientations of the infrared array sensor and adjusts an index of estimation for each image pattern. The apparatus discussed in Japanese Patent Application Laid-Open No. 2018-19361 previously determines rules of noise generation patterns of the ultrasonic sensor and adjusts an index of estimation based on a result of detection of each pattern. Thus, any of the above-mentioned estimation methods only previously determines an estimation rule and then only adjusts an index of estimation in the estimation rule. Therefore, it is desirable that a machine learning model which is able to perform learning in such a way as to optimize the estimation rule itself in conformity with the actual apparatus operating environment be applied.

SUMMARY OF THE INVENTION

However, any of the above-mentioned estimation methods is not able to acquire training data in the actual apparatus operating environment and perform learning in such a way as to optimize the estimation rule itself with use of the acquired training data. In particular, in performing supervised learning, any of the above-mentioned estimation methods is not able to generate a training data set in which time-series measured data obtained from the human presence sensor is associated with a label obtained at that time (the presence or absence of a user who uses the apparatus in the actual apparatus operating environment), during the process of the apparatus being operating. Furthermore, this issue is not an issue which is confined to image processing apparatuses but an issue which is also common to various types of information processing apparatuses.

Aspects of the present disclosure are generally directed to providing a contrivance for enabling automatically generating a training data set during the process of an apparatus being operating and enabling estimating the presence or absence of a user who uses an apparatus suited for each apparatus operating environment.

According to an aspect of the present disclosure, a machine learning system includes a sensor configured to sense an object which is present in front of an information processing apparatus, a machine learning model configured to input time-series sensed values output from the sensor and to estimate whether a user who uses the image processing apparatus is present, a user interface configured to receive an operation performed by a user, and a learning unit configured to cause the machine learning model to learn with use of training data including the time-series sensed values output from the sensor and labels that are based on presence and absence of an operation performed by a user and received by the user interface.

Further features will become apparent from the following description of exemplary embodiments with reference to the attached drawings.

BRIEF DESCRIPTION OF THE DRAWINGS

FIG. 8 is a flowchart illustrating an example of learned model updating processing.

FIGS. 11A, 11B, and 11C are diagrams illustrating an example of a behavior of movement of the user and an example of a training data set generated at that time.

FIGS. 13A, 13B, and 13C are diagrams illustrating an example of a behavior of movement of the user and an example of a training data set generated at that time.

DESCRIPTION OF THE EMBODIMENTS

Various exemplary embodiments, features, and aspects will be described in detail below with reference to the drawings.

Figure 1A:
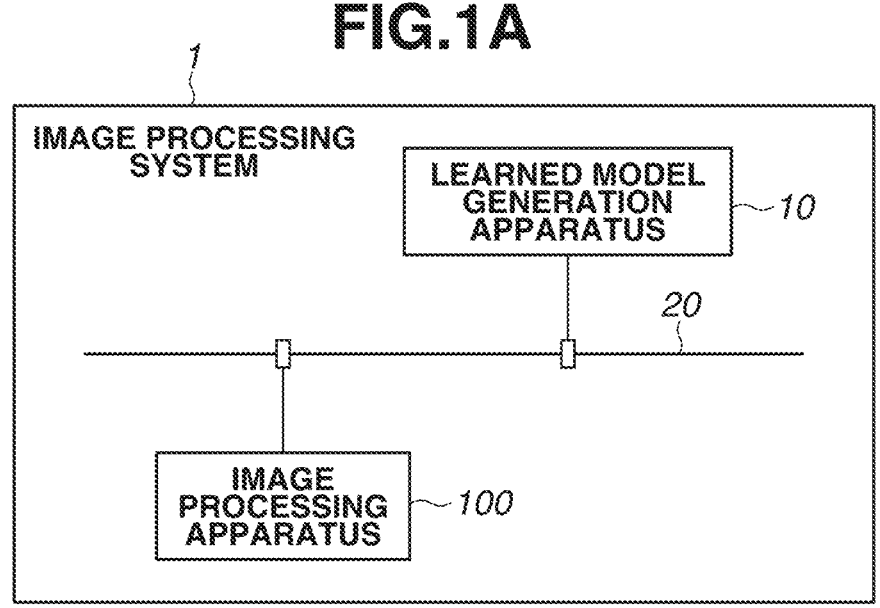
FIGS. 1A and 1B are diagrams illustrating a configuration of an image processing system and an appearance of an image processing apparatus, respectively, according to an exemplary embodiment.

FIG. 1A is an outline diagram illustrating an example of a configuration of an image processing system according to an exemplary embodiment.

As illustrated in FIG. 1A, the image processing system 1 according to the present exemplary embodiment includes a learned model generation apparatus 10 and an image processing apparatus 100, which are interconnected via a network 20 in such a way as to be able to communicate with each other.

The learned model generation apparatus 10 is configured with a personal computer (PC) or a server which generates a learned model described below. Furthermore, the learned model generation apparatus 10 can be configured with a plurality of apparatuses or can be, for example, a cloud server. For example, the learned model generation apparatus 10 can be a configuration which is implemented with use of, for example, a cloud service.

The image processing apparatus 100 is a multifunction peripheral equipped with the functions of, for example, scanning and printing.

The network 20 is configured with a local area network (LAN) or a wide area network (WAN), such as the Internet or an intranet.

The learned model generation apparatus 10 and the image processing apparatus 100 are connected directly to the network 20 or are connected to the network 20 via a connection device, such as a router, a gateway, or a proxy server (each not illustrated). Naturally, the configuration of the network 20, the connection device for each element, and the number of connection devices therefor are not limited to the above-mentioned ones, but only need to be configured to enable transmission and reception of data between the learned model generation apparatus 10 and the image processing apparatus 100. Additionally, the function of the learned model generation apparatus 10 can be configured to be provided in the image processing apparatus 100.

Figure 1B:
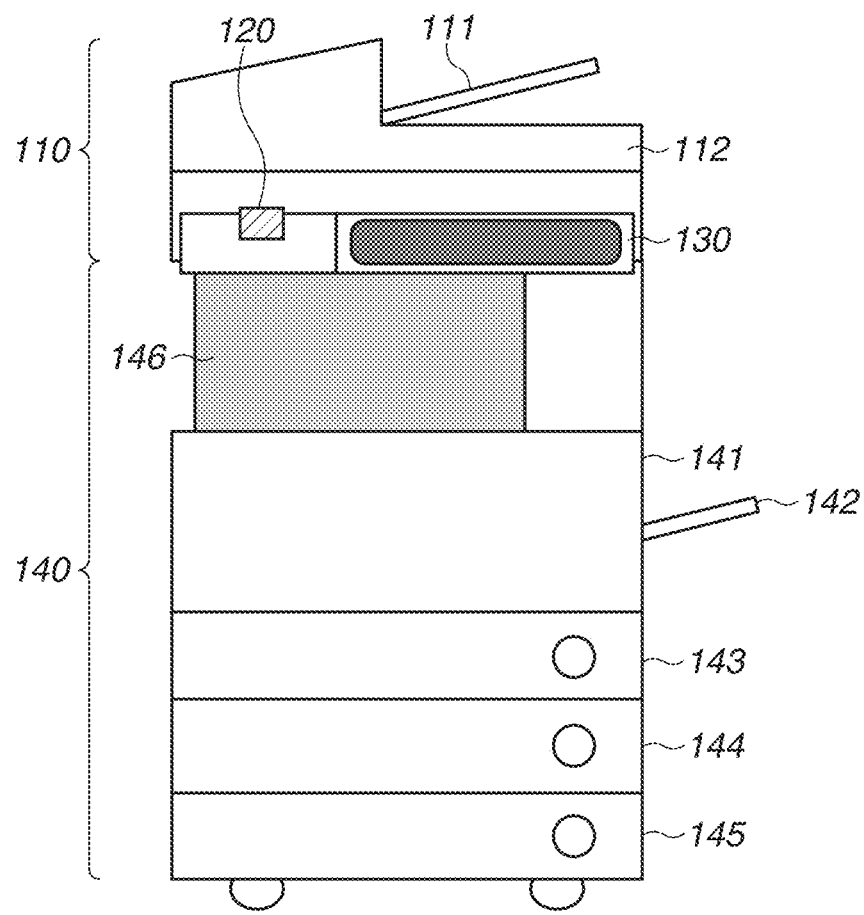

FIG. 1B is an outline diagram illustrating an example of an appearance of the image processing apparatus 100.

As illustrated in FIG. 1B, the image processing apparatus 100 includes a scanner 110, a human presence sensor 120, an operation display panel 130, and a printer 140.

The scanner 110 is a general scanner, which can be included in a multifunction peripheral. The scanner 110 is capable of performing a first reading method, which, while fixing an image reading sensor at a predetermined position, sequentially conveys sheets of a document one by one and causes the image reading sensor to read an image of each sheet of the document, and a second reading method, which causes an image reading sensor to scan a document fixedly placed on a platen glass and read an image of the document.

A document stacking tray 111 is a tray on which to stack sheets of a document, which are sequentially conveyed in the case of the first reading method. Furthermore, the document stacking tray 111 is equipped with a sensor which detects sheets of a document being stacked on the document stacking tray 111.

A document conveyance unit 112 conveys sheets of a document stacked on the document stacking tray 111 one by one in the case of the first reading method. Moreover, the document conveyance unit 112 is able to be pivotally moved up and down for opening and closing, and, in the case of the second reading method, an image of a document placed on a platen glass, which appears when the document conveyance unit 112 is pivotally moved up, is read. Furthermore, the document conveyance unit 112 is equipped with a sensor which detects the opening and closing states of the document conveyance unit 112 in upward and downward motions.

The human presence sensor 120 is a sensor for detecting a user who uses the image processing apparatus 100. The human presence sensor 120 is, for example, an infrared array sensor in which a plurality of infrared receiving elements, which receives infrared rays, is arranged in a matrix shape. Furthermore, the human presence sensor 120 only needs to be able to detect a user who approaches the image processing apparatus 100 with the intention to use the image processing apparatus 100, and can be of any type of detection method, such as an ultrasonic sensor, an electrostatic capacitance sensor, a pyroelectric sensor, or a red-green-blue (RGB) area sensor (camera).

The operation display panel 130 includes, for example, light-emitting diodes (LEDs), an operation button for switching power modes, and a liquid crystal touch display. The operation display panel 130 not only displays contents of an operation performed by the user and an internal state of the image processing apparatus 100 but also receives an operation performed by the user.

The printer 140 is a general printer, which can be included in a multifunction peripheral. The printer 140 includes a cassette 143, a cassette 144, and a cassette 145, each of which is formed in a drawer shape as a printing paper storage unit, and further includes a manual feed tray 142, which is exposed to outside the image processing apparatus 100.

To replenish the image processing apparatus 100 with sheets of printing paper, each of the cassettes 143, 144, and 145 is drawn out forward, sheets of printing paper are supplied to each cassette, and, then, each cassette is closed. Furthermore, each of the cassettes 143, 144, and 145 is equipped with a sensor which detects opening and closing of the cassette.

The manual feed tray 142 is used to supply sheets of printing paper stacked thereon to the printer 140, and is equipped with a sensor which detects sheets of printing paper being stacked on the manual feed tray 142.

Additionally, the printer 140 further includes an image forming unit 141 and a sheet discharge unit 146.

The image forming unit 141 conveys the supplied sheet of printing paper and then forms an image on the sheet of printing paper. In the image forming unit 141, a cover which covers the front surface of the image forming unit 141 is able to be opened and closed in an anterior direction, so that the user is enabled to replace consumable parts needed for image formation or remove a jammed sheet. Furthermore, the image forming unit 141 is equipped with a sensor which detects the opening and closing states of the above-mentioned cover thereof.

A sheet of printing paper with an image formed thereon by the image forming unit 141 is discharged onto the sheet discharge unit 146.

<Hardware Configuration>

Figure 2A:
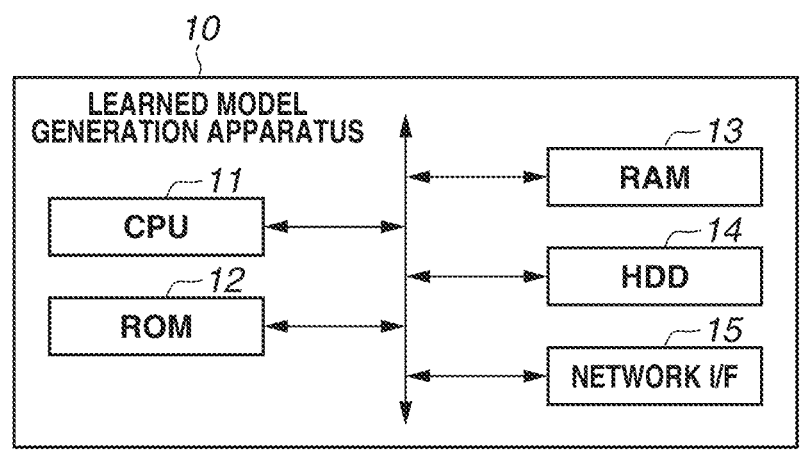
FIGS. 2A and 2B are hardware configuration diagrams of apparatuses constituting the image processing system according to the present exemplary embodiment.

FIG. 2A is a diagram illustrating an example of a hardware configuration of the learned model generation apparatus 10.

The learned model generation apparatus 10 is configured with a general computer and includes, for example, a central processing unit (CPU) 11, a read-only memory (ROM) 12, a random access memory (RAM) 13, a hard disk drive (HDD) 14, and a network interface (I/F) 15.

The CPU 11 is an execution medium which executes programs incorporated in the learned model generation apparatus 10. The ROM 12 is a non-volatile memory. The RAM 13 is a volatile memory. The HDD 14 is a storage medium such as a magnetic disk. For example, programs for performing flowcharts described below are stored in the ROM 12 or the HDD 14, and such programs are loaded onto the RAM 13 when being executed. Moreover, the RAM 13 operates as a work memory used for the programs to be executed by the CPU 11. Moreover, a learned model which is generated by the programs being executed is stored in the HDD 14.

The network I/F 15 takes charge of transmission and reception of data which are performed via the network 20.

Figure 2B:
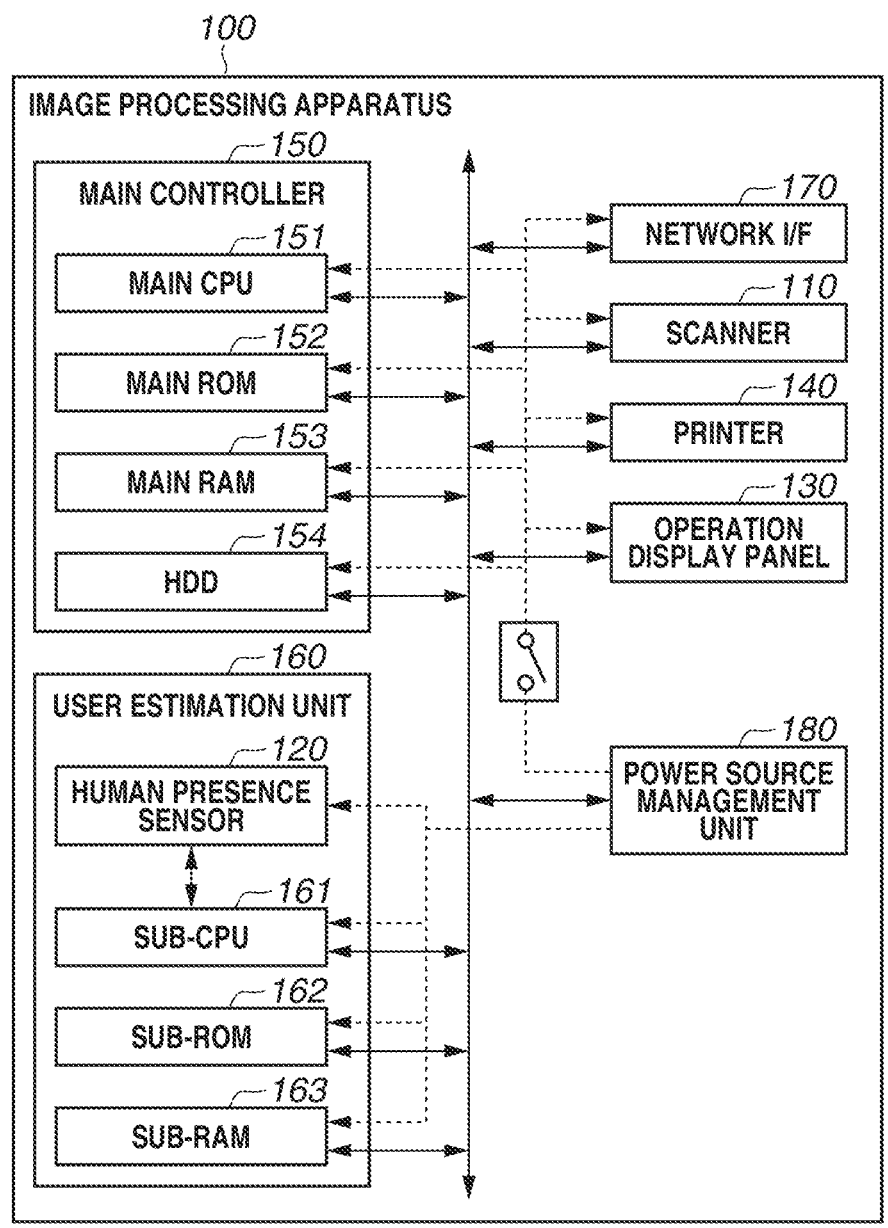

FIG. 2B is a diagram illustrating an example of a hardware configuration of the image processing apparatus 100. Furthermore, each solid line arrow denotes a signal line used to transmit or receive a control command or data. Moreover, each dotted line arrow denotes a power line.

As illustrated in FIG. 2B, the image processing apparatus 100 includes a main controller 150, a user estimation unit 160, a network I/F 170, a scanner 110, a printer 140, an operation display panel 130, and a power source management unit 180.

The main controller 150 includes a main CPU 151, a main ROM 152, a main RAM 153, and an HDD 154.

The main CPU 151 is an execution medium which executes programs incorporated in the main controller 150. The main ROM 152 is a non-volatile memory. The main RAM 153 is a volatile memory. The HDD 154 is a storage medium such as a magnetic disk. For example, programs for performing flowcharts described below are stored in the main ROM 152 or the HDD 154, and such programs are loaded onto the main RAM 153 when being executed. Moreover, the main RAM 153 operates as a work memory used for the programs to be executed by the main CPU 151.

The user estimation unit 160 includes a human presence sensor 120, a sub-CPU 161, a sub-ROM 162, and a sub-RAM 163. The sub-CPU 161 is an execution medium which executes programs incorporated in the user estimation unit 160. The sub-ROM 162 is a non-volatile memory. The sub-RAM 163 is a volatile memory. For example, programs for performing flowcharts described below are stored in the sub-ROM 162, and such programs are loaded onto the sub-RAM 163 when being executed. Moreover, the sub-RAM 163 operates as a work memory used for the programs to be executed by the sub-CPU 161.

The network I/F 170 takes charge of transmission and reception of data which are performed via the network 20. The power source management unit 180 controls supplying of power to each unit of the image processing apparatus 100.

With the above-described configuration, the image processing apparatus 100 has at least two modes as power modes. Specifically, the power modes include a standby mode, which is the state of being ready to perform ordinary operations of the image processing apparatus 100, such as scanning and printing, and a sleep mode, which consumes lower amounts of power than the standby mode.

For example, in a case where, even after a predetermined time elapses, the image processing apparatus 100 is not used by the user, the main controller 150 controls the power source management unit 180 to transition the power mode from the standby mode to the sleep mode. During the sleep mode, supplying of power to, for example, the scanner 110 and the printer 140 is stopped, and supplying of power to the main controller 150, the operation display panel 130, and the network I/F 170 is also stopped except for a part. Even during the sleep mode, the user estimation unit 160 is in a state of being able to operate. In the sleep mode, in a case where it is estimated by the user estimation unit 160 that a user who approaches the image processing apparatus 100 with the intention to use the image processing apparatus 100 is present, electric power is supplied from the power source management unit 180 to each unit. With this control performed, the image processing apparatus 100 returns from the sleep mode to the standby mode. Moreover, the main controller 150 also performs control in such a way as to switch the power modes based on pressing of a button provided on the operation display panel 130 for switching the power modes.

Furthermore, with regard to each of the above-mentioned hardware constituent elements (for example, a CPU, a ROM, a RAM, and an HDD), only one element is included in each of the learned model generation apparatus 10 illustrated in FIG. 2A and the main controller 150 and the user estimation unit 160 illustrated in FIG. 2B. However, for example, a configuration in which each of the above-mentioned hardware constituent elements includes a plurality of elements can be employed, and the respective constituent elements and their connection configurations are not limited to the above-mentioned ones. Moreover, instead of or in combination with an HDD, another type of storage device such as a solid state drive (SSD) can be included.

<Software Configuration>

Figure 3A:
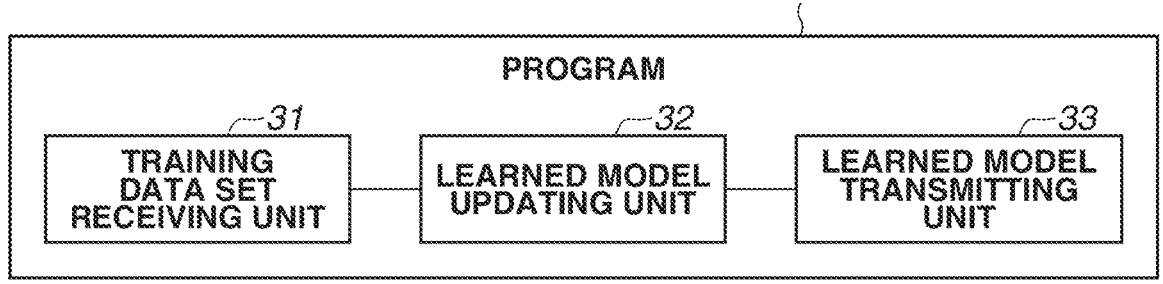
FIGS. 3A, 3B, and 3C are software configuration diagrams of the image processing system according to the present exemplary embodiment.

FIG. 3A is a block diagram illustrating a software configuration of a program 30 which is installed on the learned model generation apparatus 10. The function of the program 30 is implemented by the CPU 11 of the learned model generation apparatus 10 loading programs stored in, for example, the ROM 12 or the HDD 14 onto the RAM 13 and executing the programs as needed.

As illustrated in FIG. 3A, the program 30 includes a training data set receiving unit 31, a learned model updating unit 32, and a learned model transmitting unit 33. Details thereof are described as follows.

The training data set receiving unit 31 receives a training data set which is generated by a training data set generation unit 353 described below. The learned model updating unit 32 updates a learned model with use of the training data set received by the training data set receiving unit 31. Details of the learned model based on a machine learning model are described below with reference to FIGS. 7A, 7B, and 7C. The learned model transmitting unit 33 transmits the learned model updated by the learned model updating unit 32 to the user estimation unit 160.

Figure 3B:
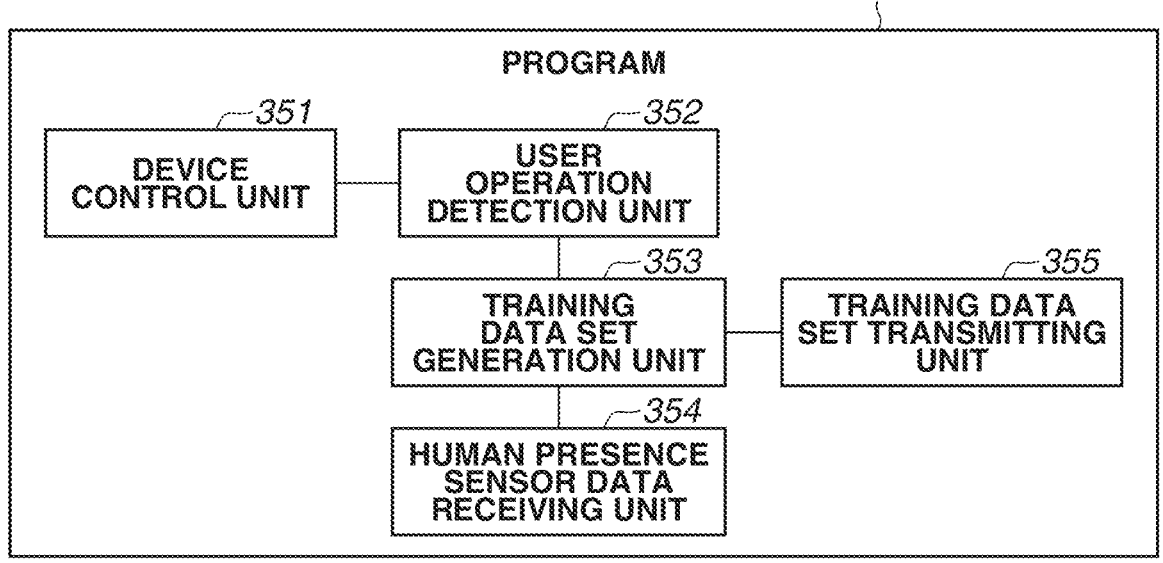

FIG. 3B is a block diagram illustrating a software configuration of a program 350 which is installed on the main controller 150. The function of the program 350 is implemented by the main CPU 151 of the main controller 150 loading programs stored in, for example, the main ROM 152 or the HDD 154 onto the main RAM 153 and executing the programs as needed.

As illustrated in FIG. 3B, the program 350 includes a device control unit 351, a user operation detection unit 352, a training data set generation unit 353, a human presence sensor data receiving unit 354, and a training data set transmitting unit 355.

The device control unit 351 issues control instructions to the scanner 110 and the printer 140, and acquires pieces of status information which are obtained from the respective sensors included in the scanner 110 and the printer 140.

The user operation detection unit 352 detects a user operation received by the operation display panel 130. For example, the user operation detection unit 352 detects pressing of the above-mentioned button for switching the power modes and a touch operation performed on the liquid crystal touch display. Moreover, the user operation detection unit 352 detects a user operation from the status information obtained via the device control unit 351. For example, the user operation detection unit 352 detects sheets of a document having been stacked on the document stacking tray 111 of the scanner 110 or the document conveyance unit 112 of the scanner 110 having been opened and closed. Moreover, for example, the user operation detection unit 352 detects the cassette 143, 144, or 145 of the printer 140 having been opened and closed, sheets of printing paper having been stacked on the manual feed tray 142 of the printer 140 or the cover of the image forming unit 141 of the printer 140 having been opened and closed.

The human presence sensor data receiving unit 354 receives human presence sensor data (time-series data sequentially acquired within a fixed time) which is acquired by a human presence sensor data acquisition unit 363 described below.

The training data set generation unit 353 associates time at which the user operation detection unit 352 detected a user operation and time at which the human presence sensor data was acquired with each other, and generates a training data set by combining the associated user operation and human presence sensor data. The training data set which is generated at this time is described below with reference to FIGS. 11A, 11B, and 11C to FIGS. 13A, 13B, and 13C. The training data set transmitting unit 355 transmits the generated training data set to the learned model generation apparatus 10.

Figure 3C:
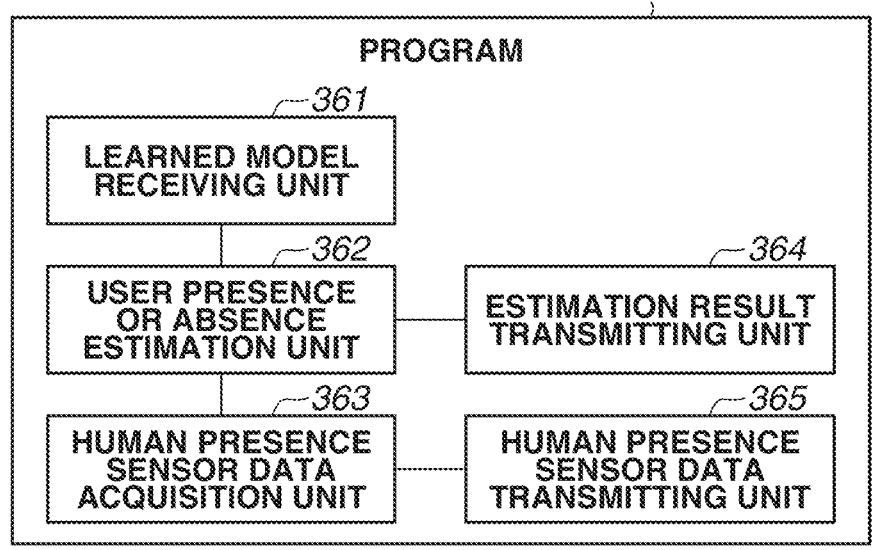

FIG. 3C is a block diagram illustrating a software configuration of a program 360 which is installed on the user estimation unit 160. The function of the program 360 is implemented by the sub-CPU 161 of the user estimation unit 160 loading programs stored in, for example, the sub-ROM 162 onto the sub-RAM 163 and executing the programs as needed.

As illustrated in FIG. 3C, the program 360 includes a learned model receiving unit 361, a user presence or absence estimation unit 362, a human presence sensor data acquisition unit 363, an estimation result transmitting unit 364, and a human presence sensor data transmitting unit 365.

The human presence sensor data acquisition unit 363 acquires measured data from the human presence sensor 120 at intervals of a predetermined time, and buffers a predetermined number of pieces of measured data in the sub-RAM 163. Moreover, in response to a transmission request from the main controller 150, the human presence sensor data transmitting unit 365 transmits the human presence sensor data buffered in the sub-RAM 163 to the main controller 150. Furthermore, the human presence sensor data transmitting unit 365 can transmit the human presence sensor data buffered in the sub-RAM 163 to the main controller 150 as needed when the main controller 150 is in the standby mode.

The user presence or absence estimation unit 362 estimates the presence of a user who approaches the image processing apparatus 100 with the intention to use the image processing apparatus 100, by inputting the measured data acquired by the human presence sensor data acquisition unit 363 to a learned model based on a machine learning model described below.

In a case where the presence of a user who approaches the image processing apparatus 100 with the intention to use the image processing apparatus 100 has been estimated by the user presence or absence estimation unit 362, the estimation result transmitting unit 364 communicates such an estimation result to the power source management unit 180 and the main controller 150.

The learned model receiving unit 361 receives the learned model updated by the learned model updating unit 32 of the learned model generation apparatus 10 and then transmitted by the learned model transmitting unit 33. After that, the user presence or absence estimation unit 362 updates the learned model which is used by the user presence or absence estimation unit 362 with the learned model received by the learned model receiving unit 361.

Furthermore, the present exemplary embodiment is not limited to a configuration in which the function of the program 30 is provided on the outside of the image processing apparatus 100, but a configuration in which the program 30 is installed on the image processing apparatus 100 can also be employed. In other words, a configuration in which the functions of the training data set receiving unit 31, the learned model updating unit 32, and the learned model transmitting unit 33 are implemented in the image processing apparatus 100 can also be employed.

<Measurement by Human Presence Sensor>

Figure 4A:
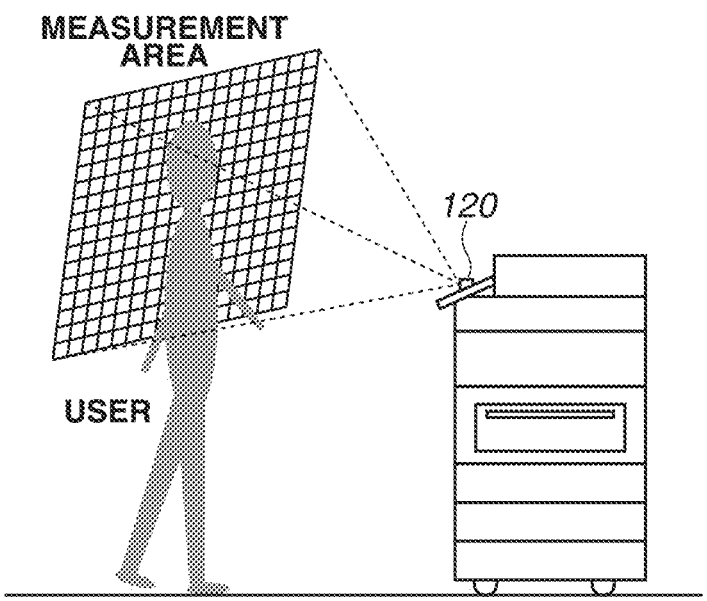
FIGS. 4A, 4B, and 4C are diagrams illustrating an example of a measurement area for a human presence sensor and an example of measured data obtained by the human presence sensor.
Figure 4B:
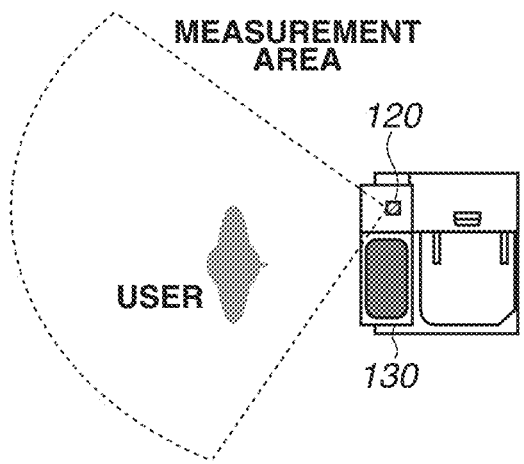

FIGS. 4A and 4B are schematic diagrams illustrating an example of a measurement area in which the human presence sensor 120 is able to perform measurement.

FIG. 4A represents a positional relationship between the human presence sensor 120, the user, and the measurement area when the image processing apparatus 100 is viewed from the lateral side thereof.

FIG. 4B represents a positional relationship between the human presence sensor 120, the user, and the measurement area when the image processing apparatus 100 is viewed from above.

The human presence sensor 120 (an infrared array sensor) receives infrared rays radiated from the heat source of an object (for example, a human body) with, for example, every one of infrared receiving elements (infrared sensors) arranged in a lattice shape. Then, the human presence sensor 120 has a feature to identify the shape of the heat source (detection region) as a temperature distribution by using temperature values that are based on the quantities of infrared rays (light receiving results) received by the respective infrared receiving elements. FIG. 4A illustrates a measurement area in which the detection surface with the infrared receiving elements of the human presence sensor 120 arranged thereon is used to perform detection. Moreover, FIG. 4B indicates that a space which radially extends from the detection surface with the infrared receiving elements of the human presence sensor 120 arranged thereon is the measurement area.

Figure 4C:
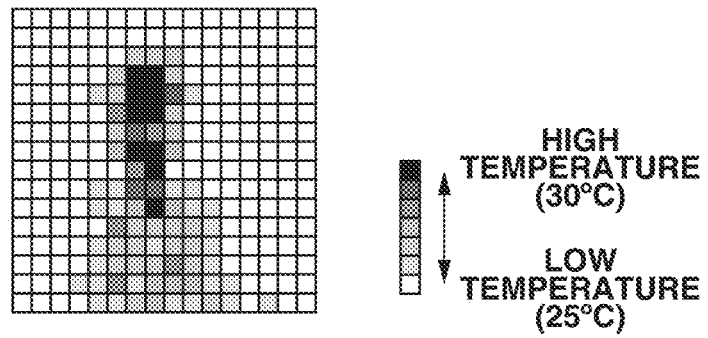

FIG. 4C illustrates an example of measured data which can be acquired from the human presence sensor 120 in a case where the relationship illustrated in FIGS. 4A and 4B exists.

As illustrated in FIG. 4C, the measured data output from the human presence sensor 120 is acquired as a two-dimensional image on the detection surface with infrared receiving elements arranged thereon. The value of each pixel of the two-dimensional image indicates the temperature which is measured from each pixel.

In the following description, cases where a user who approaches the image processing apparatus 100 with the intention to use the image processing apparatus 100 is detected are specifically described.

<Case 1>

Figure 5A:
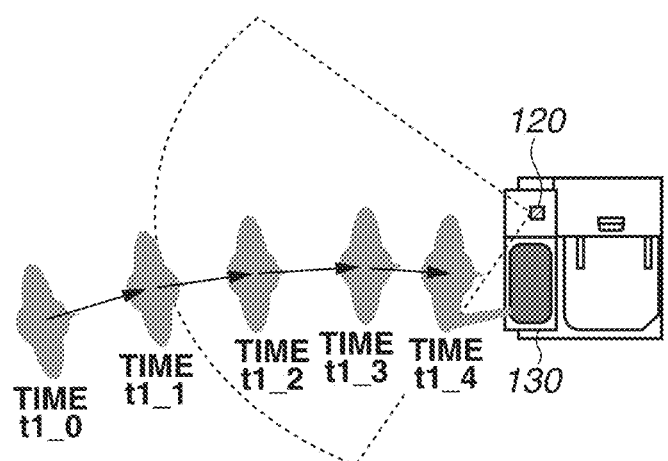
FIGS. 5A and 5B are diagrams illustrating an example of a behavior of movement of the user and an example of measured data obtained by the human presence sensor at that time.
Figure 5B:
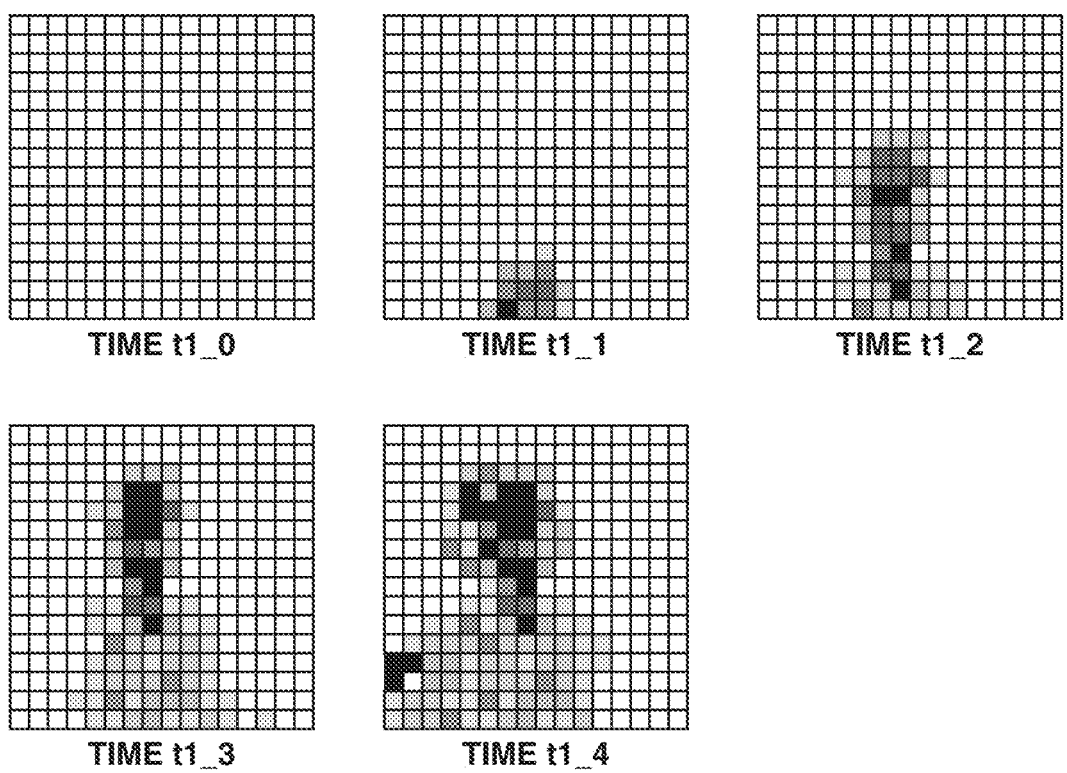

FIGS. 5A and 5B are diagrams illustrating an example of a case where a user who approaches the image processing apparatus 100 with the intention to use the image processing apparatus 100 is present.

FIG. 5A illustrates a behavior in which the user comes close to the image processing apparatus 100 in front thereof and is then operating the operation display panel 130, and also illustrates a trajectory of movement of the user during a period from time t1_0 to time t1_4.

FIG. 5B illustrates a behavior of changes of pieces of measured data which are acquired from the human presence sensor 120 at the respective times.

In the case illustrated in FIGS. 5A and 5B, it is estimated that, for example, a user who approaches the image processing apparatus 100 with the intention to use the image processing apparatus 100 is present at time t1_3, based on a feature of the temperature distribution of the measured data and a feature of the time-series change thereof. Therefore, it is desirable that the image processing apparatus 100 return from the sleep mode to the standby mode at timing of time t1_3.

<Case 2>

Figure 6A:
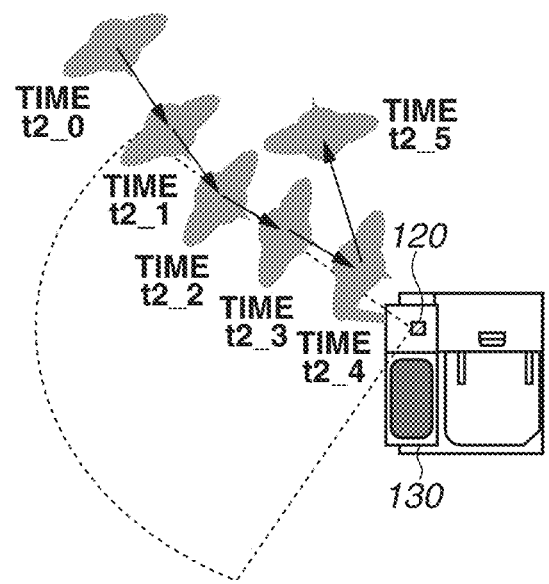
FIGS. 6A and 6B are diagrams illustrating an example of a behavior of movement of the user and an example of measured data obtained by the human presence sensor at that time.
Figure 6B:
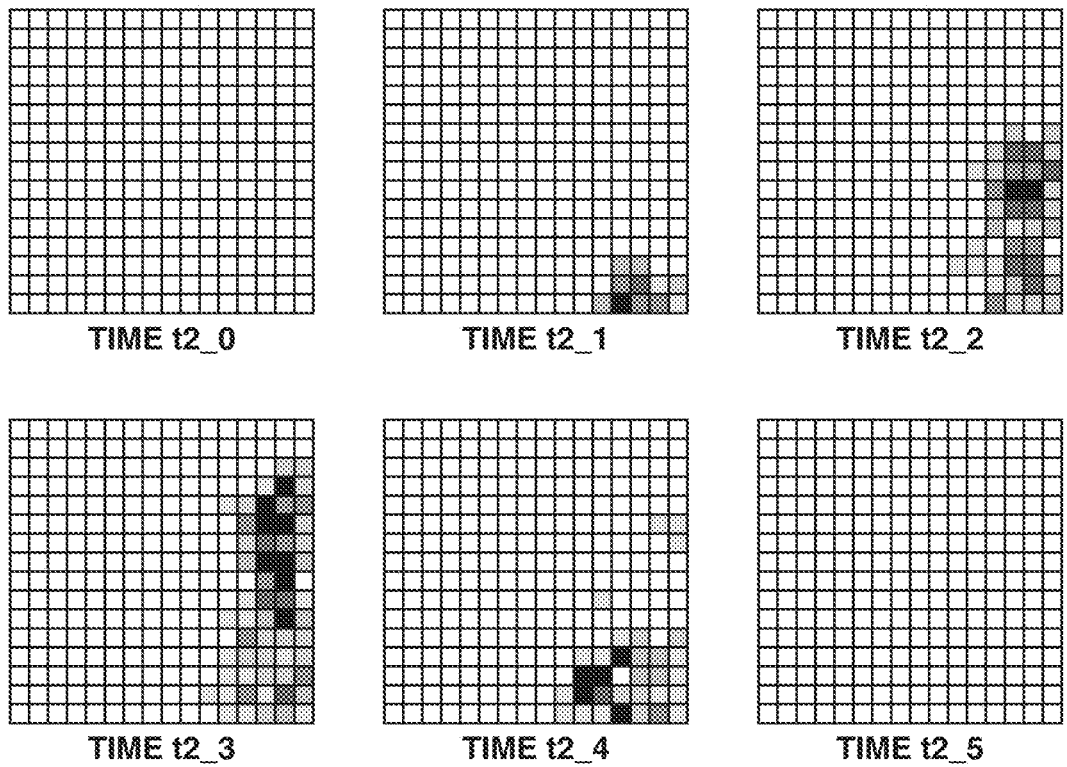

On the other hand, FIGS. 6A and 6B are diagrams illustrating a case where a user who approaches the image processing apparatus 100 with the intention to use the image processing apparatus 100 is not present.

FIG. 6A illustrates a behavior in which the user comes close to the image processing apparatus 100, picks up a printed sheet of printing paper discharged to the sheet discharge unit 146, and then moves away from the image processing apparatus 100, and also illustrates a trajectory of movement of the user during a period from time t2_0 to time t2_5.

FIG. 6B illustrates a behavior of changes of pieces of measured data which are acquired from the human presence sensor 120 at the respective times.

In the case illustrated in FIGS. 6A and 6B, it is estimated that the user has no intention of using the image processing apparatus 100. Therefore, in this case, it is desirable that the image processing apparatus 100 continue the sleeping mode.

Furthermore, a feature of the temperature distribution of measured data which is measured by the human presence sensor 120 and a feature of the time-series change thereof such as those described above vary depending on an environment in which the image processing apparatus 100 is installed and is operating (hereinafter referred to as an "apparatus operating environment"). For example, a case where a heat source which may cause a noise onto an infrared array sensor is present near the image processing apparatus 100 can also be supposed. Moreover, depending on the installation location of the image processing apparatus 100, a case where a trajectory of movement taken when the user approaches the image processing apparatus 100 with the intention to use the image processing apparatus 100 or the user passes by the image processing apparatus 100 differs can also be supposed. In this way, the presence of a user who approaches the image processing apparatus 100 with the intention to use the image processing apparatus 100 may be erroneously estimated due to a difference in the apparatus operating environment of the image processing apparatus 100. Accordingly, in the present exemplary embodiment, training a machine learning model, which is described below with reference to FIGS. 7A, 7B, and 7C, (causing the machine learning model to perform learning) based on measured data which is acquired from the human presence sensor 120 when the image processing apparatus 100 is actually operating enables estimation that is adapted for each apparatus operating environment.

<Machine Learning Model>

Figures 7A, 7B, 7C:
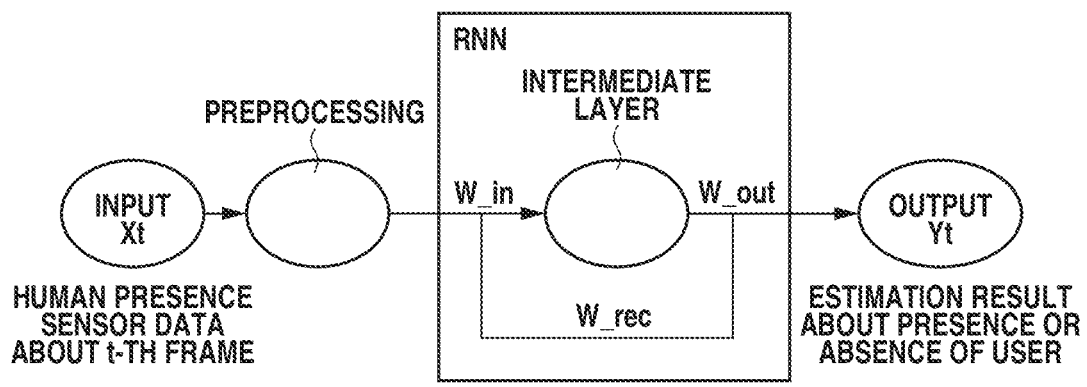
FIGS. 7A, 7B, and 7C are diagrams illustrating a machine learning model and a data structure of a training data set which is to be input to the machine learning model.

FIG. 7A is a diagram illustrating an example of a machine learning model for estimating the presence of a user who approaches the image processing apparatus 100 with the intention to use the image processing apparatus 100.

This machine learning model is configured as, for example, a recurrent neural network (RNN). This machine learning model uses measured data acquired from the human presence sensor 120 as an input, and outputs an estimation result indicating the presence or absence of a user who approaches the image processing apparatus 100 with the intention to use the image processing apparatus 100.

In FIG. 7A, an input Xt denotes measured data about the t-th frame acquired from the human presence sensor 120. The input Xt is sequentially input to the model every time measured data about each frame is acquired. Furthermore, the input Xt is input to the RNN model through preprocessing. An example of the preprocessing includes processing for applying fast Fourier transform (FFT) to measured data and, after that, removing an unnecessary frequency component from the transformed measured data.

The RNN model is implemented as a binary classification model for classifying the presence or absence of a user who approaches the image processing apparatus 100 with the intention to use the image processing apparatus 100 from measured data acquired from the human presence sensor 120 with use of, for example, a long short-term memory (LSTM). In the RNN model, the learning process is used to obtain a weight coefficient W_in to be applied to an input to an intermediate layer, a weight coefficient W_out to be applied to an output from the intermediate layer, and a weight coefficient W_rec to be applied when a past output is set as a next input. Furthermore, the number of intermediate layers and the number of units of each layer are not particularly limited.

An output Yt is an output which is obtained from an input of measured data about the t-th frame. The output Yt is an estimation accuracy of two values (0: a user who approaches the image processing apparatus 100 with the intention to use the image processing apparatus 100 not being present, 1: a user who approaches the image processing apparatus 100 with the intention to use the image processing apparatus 100 being present) into which the above-mentioned binary classification model performs classification.

Performing learning with use of measured data acquired from the human presence sensor 120 when the image processing apparatus 100 is operating via the above-mentioned machine learning model enables obtaining the weight coefficients W_in, W_out, and W_rec which are used to perform estimation adapted for each apparatus operating environment.

FIGS. 7B and 7C are diagrams illustrating an example of a training data set which is used for a training process (a learning process) of the machine learning model illustrated in FIG. 7A.

The training data set includes human presence sensor data, which serves as an input to the machine learning model, and a label, which indicates the presence of absence of a user who approaches the image processing apparatus 100 with the intention to use the image processing apparatus 100, and is implemented as array data in which there are a predetermined number of pieces of data about times (frames) including successive pieces of human presence sensor data and labels.

In FIGS. 7B and 7C, each value set forth in the column of "index" represents an index value of the array data.

Each value set forth in the column of "human presence sensor data" indicates that, for example, "tn_0" is measured data acquired from the human presence sensor 120 at time tn_0.

Each value set forth in the column of "label" represents a binary state obtained by classification performed by the above-mentioned binary classification model.

Furthermore, it is necessary to previously generate a plurality of training data sets such as those mentioned above to be used for the above-mentioned training process of the machine learning model.

A training data set 701 illustrated in FIG. 7B represents an example of a case where a user who approaches the image processing apparatus 100 with the intention to use the image processing apparatus 100 is present. In the behavior indicated in this example, the training data set is generated in such a manner that the value of the label changes from "0" to "1" at timing (time tn_N-c) at which it is desirable that the image processing apparatus 100 recognize that a user who uses the image processing apparatus 100 is present.

On the other hand, a training data set 702 illustrated in FIG. 7C represents an example of a case where a user who approaches the image processing apparatus 100 with the intention to use the image processing apparatus 100 is not present. Therefore, in this example, the training data set is generated in such a manner that the values of the labels at all of the times are "0".

Furthermore, the machine learning model is not limited to the example illustrated in FIGS. 7A to 7C, but can be of any form.

<Learned Model Updating Processing>

FIG. 8 is a flowchart illustrating an example of learned model updating processing, which is a part of the program 30 incorporated in the learned model generation apparatus 10. The learned model updating processing is implemented by the CPU 11 of the learned model generation apparatus 10 loading the program 30 stored in, for example, the ROM 12 or the HDD 14 onto the RAM 13 and executing the program 30 as needed. Furthermore, the learned model updating processing is started when the learned model generation apparatus 10 has received an updating instruction issued by a user operation. Moreover, the learned model updating processing can be started when a predetermined number or more of training data sets have been generated by the training data set generation unit 353 and the learned model generation apparatus 10 has received an updating instruction from the main controller 150 at that time.

First, in step S1101, the training data set receiving unit 31 receives training data sets generated by the training data set generation unit 353 and then transmitted by the training data set transmitting unit 355, and stores the received training data sets in the RAM 13 or the HDD 14.

Next, in step S1102, the learned model updating unit 32 reads the training data sets stored in step S1101 one by one.

Then, in step S1103, the learned model updating unit 32 inputs the training data set read in step S1102 to the above-mentioned machine learning model, and performs learning of the model with use of, for example, an error back propagation algorithm or a gradient descent method, thus obtaining weight coefficients W_in, W_out, and W_rec.

Next, in step S1104, the learned model updating unit 32 checks whether there is any data set that is not yet read and used for learning out of the training data sets received and stored in step S1101. Then, if it is determined that there is a training data set that is not yet used for learning (YES in step S1104), the learned model updating unit 32 returns the processing to step S1102, in which the learned model updating unit 32 performs control in such a way as to perform learning processing using a next training data set.

Then, if it is determined that learning processing has been completed with respect to all of the training data sets received and stored in step S1101 (NO in step S1104), the learned model updating unit 32 advances the processing to step S1105.

In step S1105, the learned model transmitting unit 33 transmits an updating instruction for the learned model to the user estimation unit 160 via the network 20, and then ends the learned model updating processing.

<User Estimation Processing>

Figure 9:
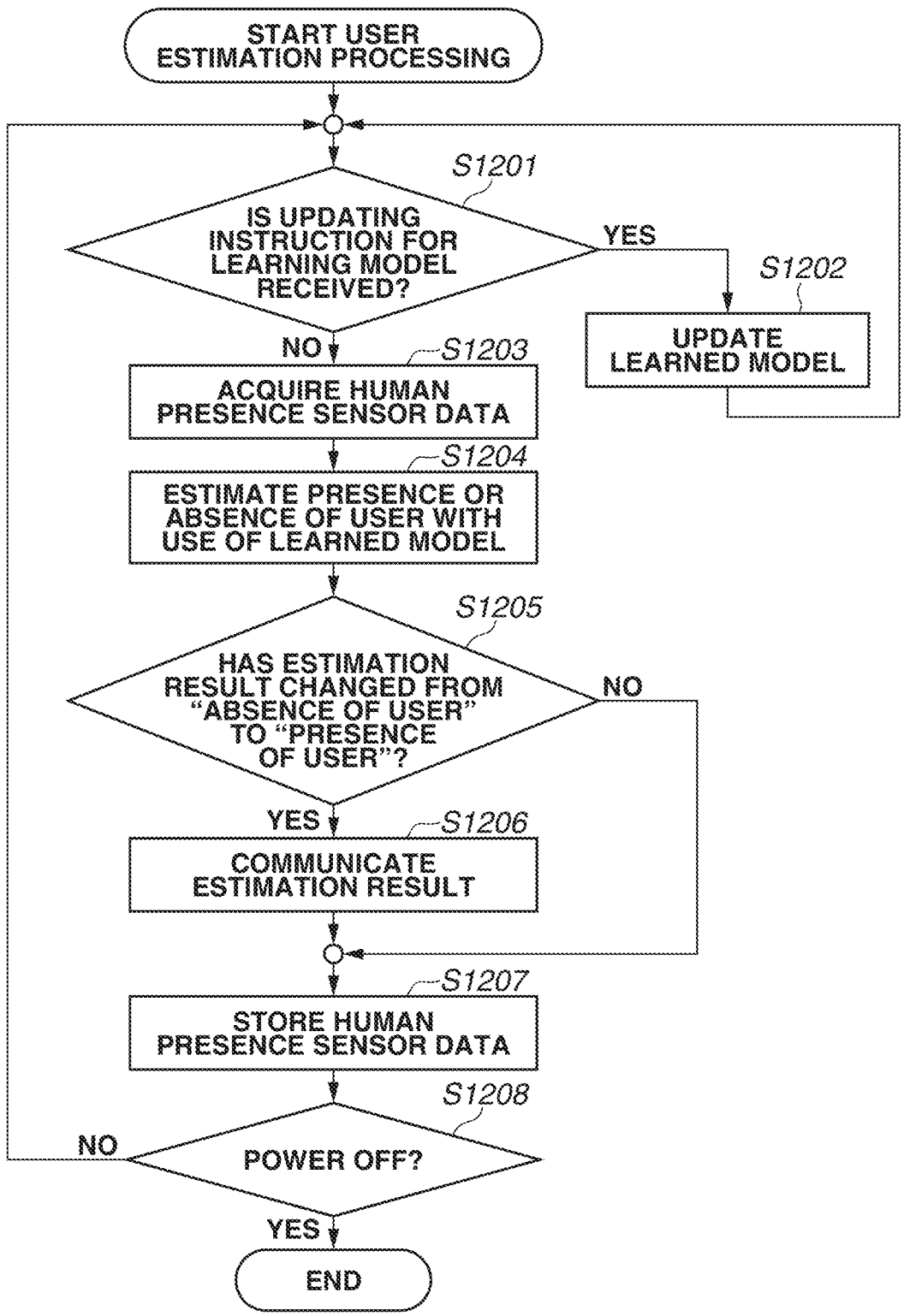
FIG. 9 is a flowchart illustrating an example of user estimation processing.

FIG. 9 is a flowchart illustrating an example of user estimation processing, which is a part of the program 360 incorporated in the user estimation unit 160. The user estimation processing is implemented by the sub-CPU 161 of the user estimation unit 160 loading the program 360 stored in, for example, the sub-ROM 162 onto the sub-RAM 163 and executing the program 360 as needed. Furthermore, the user estimation processing is started when electric power is supplied to the user estimation unit 160 by the power source management unit 180.

First, in step S1201, the learned model receiving unit 361 checks whether the above-mentioned updating instruction for the learned model transmitted by the learned model transmitting unit 33 via the network 20 has been received. Then, if it is determined that the updating instruction for the learned model has been received (YES in step S1201), the learned model receiving unit 361 advances the processing to step S1202.

In step S1202, the learned model receiving unit 361 receives the latest learned model (for example, the weight coefficients W_in, W_out, and W_rec), which has been updated by the learned model updating unit 32, from the learned model transmitting unit 33. Additionally, the learned model receiving unit 361 updates a learned model stored in the sub-RAM 163 with the received latest learned model.

On the other hand, if it is determined that the updating instruction for the learned model has not been received (NO in step S1201), the learned model receiving unit 361 advances the processing to step S1203.

In step S1203, the human presence sensor data acquisition unit 363 acquires measured data (human presence sensor data) from the human presence sensor 120.

Next, in step S1204, the user presence or absence estimation unit 362 estimates the presence or absence of a user who approaches the image processing apparatus 100 with the intention to use the image processing apparatus 100, by inputting the measured data acquired in step S1203 to the learned model stored in the sub-RAM 163.

Next, in step S1205, the user presence or absence estimation unit 362 determines whether the estimation result obtained in step S1204 has changed from "absence of user" to "presence of user". More specifically, the user presence or absence estimation unit 362 determines whether the output Yt, which is an estimation accuracy of two values (0: a user who approaches the image processing apparatus 100 with the intention to use the image processing apparatus 100 not being present, 1: a user who approaches the image processing apparatus 100 with the intention to use the image processing apparatus 100 being present) has changed from less than 0.5 to greater than or equal to 0.5.

Then, if it is determined that the estimation result has changed from "absence of user" to "presence of user" (YES in step S1205), the user presence or absence estimation unit 362 advances the processing to step S1206.

In step S1206, the estimation result transmitting unit 364 communicates the determined estimation result to the power source management unit 180 and the main controller 150, and then advances the processing to step S1207. In response to such a communication, the power source management unit 180 becomes able to cause the image processing apparatus 100 to return from the sleep mode to the standby mode. Moreover, in response to such a communication, the main controller 150 is able to recognize that the estimation result has changed from "absence of user" to "presence of user".

On the other hand, if, in step S1205, it is determined that the estimation result has not changed from "absence of user" to "presence of user" (NO in step S1205), the user presence or absence estimation unit 362 advances the processing to step S1207.

In step S1207, the human presence sensor data acquisition unit 363 stores the measured data acquired in step S1203 in the sub-RAM 163. At that time, a predetermined number of previously-acquired pieces of measured data are assumed to be buffered in the sub-RAM 163.

If the image processing apparatus 100 does not become powered off (NO in step S1208), the learned model receiving unit 361 returns the processing to step S1201, thus continuing the processing. Furthermore, if the image processing apparatus 100 becomes powered off (YES in step S1208), the user estimation processing ends.

<Training Data Set Generation Processing>

Figure 10:
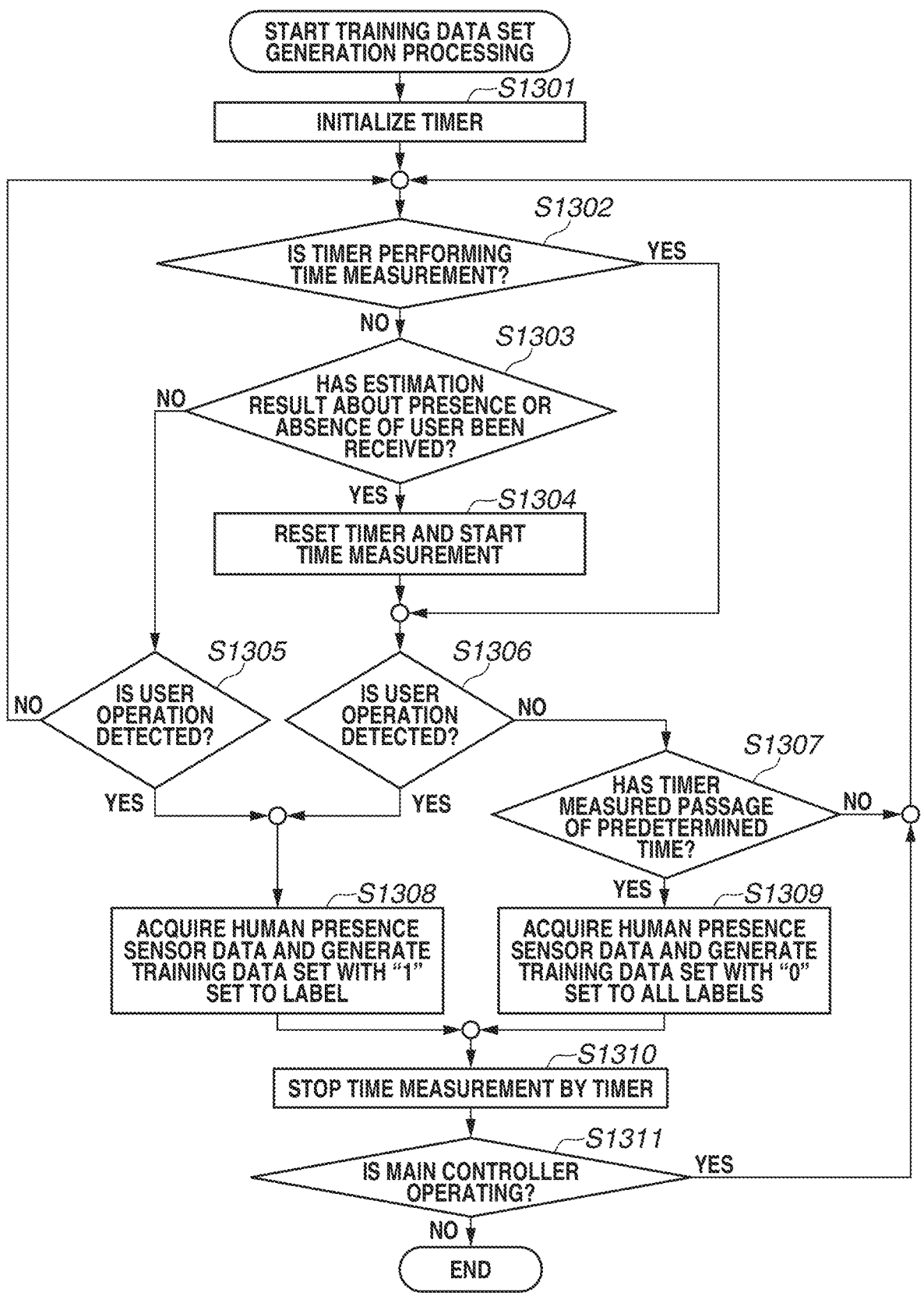
FIG. 10 is a flowchart illustrating an example of training data set generation processing.

FIG. 10 is a flowchart illustrating an example of training data set generation processing, which is a part of the program 350 incorporated in the main controller 150. The training data set generation processing is implemented by the main CPU 151 of the main controller 150 loading the program 350 stored in, for example, the main ROM 152 or the HDD 154 onto the main RAM 153 and executing the program 350 as needed. Furthermore, the training data set generation processing is started in conjunction with the main controller 150 starting operating.

First, in step S1301, the training data set generation unit 353 initializes a timer for measuring a time elapsing from reception of the estimation result transmitted from the estimation result transmitting unit 364, and causes the timer to stop measuring time.

Next, in step S1302, the training data set generation unit 353 determines whether the timer is performing time measurement. Then, if it is determined that the timer is not performing time measurement (NO in step S1302), the training data set generation unit 353 advances the processing to step S1303.

In step S1303, the training data set generation unit 353 checks whether the human presence sensor data receiving unit 354 has received the communication of the estimation result transmitted in step S1206 illustrated in FIG. 9. Furthermore, the communication of the estimation result transmitted in step S1206 illustrated in FIG. 9 is an estimation result communicated in a case where the estimation result obtained by the user estimation unit 160 has changed from "absence of user" to "presence of user".

Then, if it is determined that the human presence sensor data receiving unit 354 has received the estimation result (YES in step S1303), the training data set generation unit 353 determines that the estimation result has changed from "absence of user" to "presence of user" and thus advances the processing to step S1304.

In step S1304, the training data set generation unit 353 resets the timer to "0" and causes the timer to start measuring time, and then advances the processing to step S1306.

Moreover, if, in step S1302, it is determined that the timer is performing time measurement (YES in step S1302), the training data set generation unit 353 skips step S1304 and advances the processing to step S1306.

This enables the timer to measure a time elapsing from when the estimation result has changed from "absence of user" to "presence of user".

In step S1306, the training data set generation unit 353 determines whether a user operation is detected by the user operation detection unit 352. Then, if no user operation is detected (NO in step S1306), the training data set generation unit 353 advances the processing to step S1307.

In step S1307, the training data set generation unit 353 determines whether the timer performing time measurement has detected passage of a predetermined time. If it is determined that the timer performing time measurement has not yet detected passage of the predetermined time (NO in step S1307), the training data set generation unit 353 returns the processing to step S1302.

Moreover, if, in step S1307, it is determined that the timer performing time measurement has detected passage of the predetermined time (YES in step S1307), the training data set generation unit 353 advances the processing to step S1309. This corresponds to a case where, although the estimation result indicates "presence of user", no user operation has been detected even after passage of the predetermined time. In other words, this corresponds to "a case where the estimation result about the presence or absence of a user who approaches the image processing apparatus 100 with the intention to use the image processing apparatus 100 and the actual presence or absence of such a user do not coincide with each other". Details thereof are described below with reference to FIGS. 13A, 13B, and 13C.

In this case, in step S1309, the training data set generation unit 353 receives, via the human presence sensor data receiving unit 354, the measured data transmitted from the human presence sensor data transmitting unit 365. The measured data as received here corresponds to a predetermined number of pieces of measured data which have been buffered in the sub-RAM 163 in step S1207 illustrated in FIG. 9. Additionally, the training data set generation unit 353 generates a training data set in which labels are set to the received predetermined number of pieces of measured data. In step S1309, the training data set generation unit 353 generates a training data set in which the label "0" is set to all of the predetermined number of pieces of measured data.

Furthermore, the label "0" represents "a user who approaches the image processing apparatus 100 with the intention to use the image processing apparatus 100 is not present". Moreover, the label "1" represents "a user who approaches the image processing apparatus 100 with the intention to use the image processing apparatus 100 is present".

Moreover, if, in step S1306, it is determined that a user operation is detected by the user operation detection unit 352 (YES in step S1306), the training data set generation unit 353 advances the processing to step S1308. This corresponds to a case where a user operation has been detected within the predetermined time elapsing from when "presence of user" has been estimated. In other words, this corresponds to "a case where the estimation result about the presence or absence of a user who approaches the image processing apparatus 100 with the intention to use the image processing apparatus 100 and the actual presence or absence of such a user coincide with each other". Details thereof are described below with reference to FIGS. 11A, 11B, and 11C.

In this case, in step S1308, the training data set generation unit 353 receives, via the human presence sensor data receiving unit 354, the measured data transmitted from the human presence sensor data transmitting unit 365. The measured data as received here corresponds to a predetermined number of pieces of measured data which have been buffered in the sub-RAM 163 in step S1207 illustrated in FIG. 9. Additionally, the training data set generation unit 353 generates a training data set in which labels are set to the received predetermined number of pieces of measured data. In step S1308, the training data set generation unit 353 generates a training data set in which the label "1" is set to measured data close to the time at which the user operation has been detected out of the predetermined number of pieces of measured data and the label "0" is set to the other pieces of measured data. Furthermore, the above-mentioned "measured data close to the time at which the user operation has been detected" is assumed to represent, for example, measured data obtained at the time at which the user operation has been detected and measured data obtained one time before that time. However, measured data obtained at timing at which the user operation has been detected to measured data obtained at two times before that timing can be set as the above-mentioned "measured data close to the time at which the user operation has been detected".

Moreover, if, in step S1303, it is determined that the human presence sensor data receiving unit 354 has not received the estimation result (NO in step S1303), the training data set generation unit 353 determines that "absence of user" has been estimated and thus advances the processing to step S1305.

In step S1305, the training data set generation unit 353 determines whether a user operation is detected by the user operation detection unit 352. Then, if no user operation is detected (NO in step S1305), the training data set generation unit 353 returns the processing to step S1302.

On the other hand, if it is determined that a user operation is detected by the user operation detection unit 352 (YES in step S1305), the training data set generation unit 353 advances the processing to step S1308. This corresponds to a case where, although "absence of user" has been estimated, a user operation has been detected. In other words, this corresponds to "a case where the estimation result about the presence or absence of a user who approaches the image processing apparatus 100 with the intention to use the image processing apparatus 100 and the actual presence or absence of such a user do not coincide with each other". Details thereof are described below with reference to FIGS. 12A, 12B, and 12C.

After completion of processing in step S1308 or S1309, then in step S1310, the training data set generation unit 353 stops time measurement by the timer.

Then, as long as the main controller 150 is operating (YES in step S1311), the training data set generation unit 353 returns the processing to step S1302, thus continuing processing. Furthermore, if the main controller 150 stops (NO in step S1311), the training data set generation processing also ends.

<Specific Examples of Training Data Sets which are Generated>

Next, examples of training data sets which are generated through the above-described training data set generation processing are described with reference to FIGS. 11A to 11C to FIGS. 13A to 13C.

FIGS. 11A to 11C to FIGS. 13A to 13C are diagrams illustrating examples of training data sets which are generated by the training data set generation processing. Details thereof are described as follows.

FIGS. 11A to 11C correspond to a case where, after the user presence or absence estimation unit 362 has estimated that a user who approaches the image processing apparatus 100 with the intention to use the image processing apparatus 100 is present, the user performs an operation with respect to the image processing apparatus 100. In other words, FIGS. 11A to 11C correspond to "a case where the estimation result about the presence or absence of a user who approaches the image processing apparatus 100 with the intention to use the image processing apparatus 100 and the actual presence or absence of such a user coincide with each other".

FIG. 11A illustrates an example of a trajectory of movement of the user during a period from time t3_0 to time t3_4.

FIG. 11B illustrates a list of "user presence or absence estimation results" and "user operation detection results" obtained at the respective times.

In FIG. 11B, "user presence or absence estimation result" represents a result which the user presence or absence estimation unit 362 outputs using, as an input, measured data acquired from the human presence sensor 120 at the time indicated by the value in the column of "time", with use of the above-mentioned machine learning model.

For example, the user presence or absence estimation result "N" at time t3_0 indicates estimating that a user who approaches the image processing apparatus 100 with the intention to use the image processing apparatus 100 is not present.

Conversely, the user presence or absence estimation result "Y" at time t3_3 indicates estimating that a user who approaches the image processing apparatus 100 with the intention to use the image processing apparatus 100 is present.

In FIG. 11B, "user operation detection result" represents a result which the user operation detection unit 352 detects at the time indicated by the value in the column of "time".

For example, the user operation detection result "N" at time t3_0 indicates that no user operation is detected by the user operation detection unit 352.

Conversely, the user operation detection result "Y" at time t3_4 indicates that a user operation is detected by the user operation detection unit 352.

FIG. 11C illustrates an example of a training data set which is generated under the state illustrated in FIG. 11B.

The training data set 801 is a training data set which is generated in step S1308 illustrated in FIG. 10 as a result of a user operation being detected in step S1306 at time t3_4. The training data set is generated in such a manner that the label "1" is set in association with pieces of human presence sensor data obtained at times close to the time t3_4 (for example, that time t3_4 and time t3_3, which is one time before that time), and the label "0" is set to pieces of human presence sensor data obtained at the other times.

This is aimed at causing the image processing apparatus 100 to return from the sleep mode to the standby mode a little before the user completely comes close to the image processing apparatus 100, by setting "1" to the label of measured data obtained a predetermined time before the time at which a user operation has been detected. This reduces a waiting time of the user caused by returning, and enables improving operability.

Generating a training data set in this way enables increasing pieces of training data in "a case where the estimation result about the presence or absence of a user who approaches the image processing apparatus 100 with the intention to use the image processing apparatus 100 and the actual presence or absence of such a user coincide with each other".

Figures 12A, 12B, 12C:
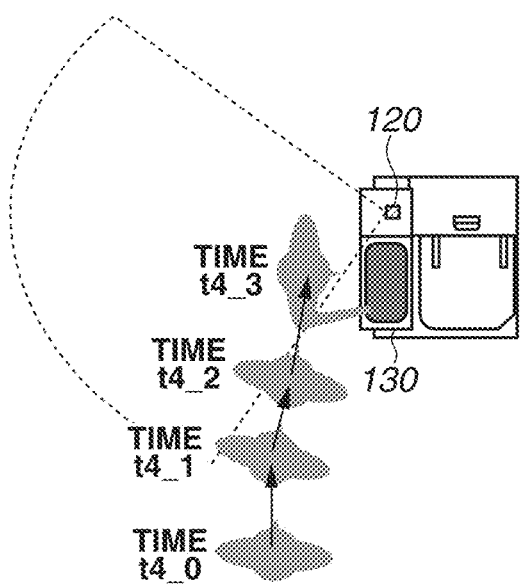
FIGS. 12A, 12B, and 12C are diagrams illustrating an example of a behavior of movement of the user and an example of a training data set generated at that time.

FIGS. 12A to 12C correspond to a case where, although the user presence or absence estimation unit 362 has estimated that a user who approaches the image processing apparatus 100 with the intention to use the image processing apparatus 100 is not present, actually, a user with the intention to use the image processing apparatus 100 is present and the user performs an operation with respect to the image processing apparatus 100. In other words, FIGS. 12A to 12C correspond to "a case where the estimation result about the presence or absence of a user who approaches the image processing apparatus 100 with the intention to use the image processing apparatus 100 and the actual presence or absence of such a user do not coincide with each other".

FIG. 12A illustrates an example of a trajectory of movement of the user during a period from time t4_0 to time t4_3.

FIG. 12B illustrates a list of "user presence or absence estimation results" and "user operation detection results" obtained at the respective times.

FIG. 12C illustrates an example of a training data set which is generated under the state illustrated in FIG. 12B.

The training data set 901 is a training data set which is generated in step S1308 illustrated in FIG. 10 as a result of a user operation being detected in step S1305 at time t4_3. The training data set is generated in such a manner that the label "1" is set in association with pieces of human presence sensor data obtained at times close to the time t4_3 (for example, that time t4_3 and time t4_2, which is one time before that time), and the label "0" is set to pieces of human presence sensor data obtained at the other times.

Generating a training data set in this way enables increasing pieces of learning data in "a case where the estimation result about the presence or absence of a user who approaches the image processing apparatus 100 with the intention to use the image processing apparatus 100 and the actual presence or absence of such a user do not coincide with each other".

FIGS. 13A to 13C correspond to a case where, although the user presence or absence estimation unit 362 has estimated that a user who approaches the image processing apparatus 100 with the intention to use the image processing apparatus 100 is present, actually, a user with the intention to use the image processing apparatus 100 is not present. In other words, FIGS. 13A to 13C correspond to "a case where the estimation result about the presence or absence of a user who approaches the image processing apparatus 100 with the intention to use the image processing apparatus 100 and the actual presence or absence of such a user do not coincide with each other".

FIG. 13A illustrates an example of a trajectory of movement of the user during a period from time t5_0 to time t5_6.

FIG. 13B illustrates a list of "user presence or absence estimation results" and "user operation detection results" obtained at the respective times.

FIG. 13C illustrates an example of a training data set which is generated under the state illustrated in FIG. 13B.

The training data set 1001 is a training data set which is generated in step S1309 illustrated in FIG. 10 as a result of determining that, in steps S1306 and S1307 at time t5_6, no user operation is detected even after a predetermined time elapses after it is estimated that a user who approaches the image processing apparatus 100 with the intention to use the image processing apparatus 100 is present.

Pieces of human presence sensor data obtained from time t5_4, at which the user presence or absence estimation unit 362 has last estimated that a user who approaches the image processing apparatus 100 with the intention to use the image processing apparatus 100 is present, to the time a predetermined period before that time (for example, time t5_1, which is three times before the time t5_4) are targeted for a training data set. Then, in this case, the training data set is generated in such a manner that all of the labels are set to "0".

Generating a training data set in this way enables increasing pieces of learning data in "a case where the estimation result about the presence or absence of a user who approaches the image processing apparatus 100 with the intention to use the image processing apparatus 100 and the actual presence or absence of such a user do not coincide with each other".

As described above, according to the present exemplary embodiment, it is possible to automatically generate a training data set obtained when an image processing apparatus is operating. The training data set which is automatically generated is a set of data in which time-series data obtained from a human presence sensor, which is actually measured when the image processing apparatus is operating, and a label which indicates whether a user who uses the image processing apparatus is present at timing of each piece of the measured data are associated with each other. Performing learning with use of such a training data set enables appropriately establishing a model which estimates the presence of a user who uses an apparatus suited for each apparatus operating environment. As a result, it becomes possible to implement an image processing apparatus capable of performing power saving control to appropriately control a power-supplied state of the apparatus while estimating the presence of a user who uses the apparatus, suited for each apparatus operating environment. Therefore, it becomes possible to perform learning suited for each of various apparatus operating environments and to accurately estimate a user who uses the apparatus.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-149173 filed Aug. 8, 2018, which is hereby incorporated by reference herein in its entirety.

What is claimed is:

1. A machine learning system comprising:
a sensor having a plurality of elements arranged in a two-dimensional array, and configured to output a plurality of output values corresponding to input to the plurality of elements in time series;
a machine learning unit configured to input data sets each including the plurality of output values in time series output from the sensor and to estimate whether a user who uses an information processing apparatus is present;
a user interface configured to receive an operation by a user; and
a controller including a processor and a memory, and configured to cause the machine learning unit to learn with a plurality of training data sets including a plurality of output values in time series output from the sensor and labels, each of the labels being added in association with a corresponding output value among the plurality of output values, the labels indicating presence or absence of an operation received by the user interface at a time at which the corresponding output value is output.

2. A machine learning system comprising:
a sensor having a plurality of elements arranged in a two-dimensional array, and configured to output a plurality of output values corresponding to input to the plurality of elements in time series;
a machine learning unit configured to input a data set which includes the plurality of output values in time series output from the sensor and to estimate whether a user who uses an information processing apparatus is present;
a user interface configured to receive an operation by a user; and
a controller including a processor and a memory, and configured to cause the machine learning unit to learn with a plurality of training data sets, each of the training data sets including a plurality of output values in time series output from the sensor and labels, the respective labels being added in association with a corresponding one of the output values, the labels indicating an operation received by the user interface at a time at which the respective output values are output.

3. The machine learning system according to claim 2, wherein a first label is set to an output value output from the sensor at timing at which an operation received by the user interface, and a second label is set to the other output value output from the sensor at timing at which no operation received by the user interface.

4. The machine learning system according to claim 3, wherein the training data sets includes a plurality of output values in time series output during a period from timing at which an operation is received by the user interface to timing a predetermined period before the timing at which an operation is received by the user interface.

5. The machine learning system according to claim 4, wherein, in a case where the user interface does not receive an operation by a user within a predetermined time after the machine learning unit estimates that a user who uses the information processing apparatus is present, the second label is set to output values output within the predetermined period.

6. The machine learning system according to claim 2, wherein the machine learning unit having learned with the training data sets inputs data sets each including a plurality of output values in time series output from the sensor, and estimates whether a user who uses the information processing apparatus is present.

7. The machine learning system according to claim 2, wherein the machine learning system comprises a first information processing apparatus including the sensor, the machine learning unit, and the user interface, and a second information processing apparatus comprises the controller.

8. The machine learning system according to claim 2, wherein the information processing apparatus is able to transition between a first power-supplied state and a second power-supplied state lower in power consumption than the first power-supplied state, and the controller configured to transition a power-supplied state of the information processing apparatus from the second power-supplied state to the first power-supplied state in a case where the machine learning unit has estimated that a user who uses the information processing apparatus is present.

9. The machine learning system according to claim 2, wherein the sensor is an ultrasonic sensor.

10. The machine learning system according to claim 2, wherein the sensor is an infrared array sensor in which a plurality of infrared receiving elements is arranged.

11. The machine learning system according to claim 2, wherein the controller is configured to transmit an updating instruction for the machine learning unit after the learning with a plurality of training data sets and to update the machine learning unit when receiving the updating instruction.

12. The machine learning system according to claim 2, wherein the labels indicate an operation received or no operation received by the user interface at a time at which the corresponding output value is output.

13. A machine learning system comprising:
a sensor having a plurality of elements arranged in a two-dimensional array, and configured to output a plurality of output values in a row corresponding to input to the plurality of elements;
a machine learning unit configured to input data set which includes the plurality of output values in a row output from the sensor and to estimate whether a user who uses an information processing apparatus is present;
a user interface configured to receive an operation by a user; and
a controller including a processor and a memory, and configured to cause the machine learning unit to learn with a plurality of training data sets, each of the training data sets including a plurality of output values successively output from the sensor and labels, the respective labels being added in association with a corresponding one of the output values, the labels indicating an operation received by the user interface at a time at which the corresponding output value is output.

* * * * *